Aug. 19, 1941.　　C. J. BELLA ET AL　　2,252,878

SAFETY DEVICE FOR TRUCKS AND OTHER VEHICLES

Filed May 17, 1941

INVENTORS
Charles J. Bella
and
Edward W. Souter

By J. E. Trabucco
ATTORNEY.

Patented Aug. 19, 1941

2,252,878

UNITED STATES PATENT OFFICE 2,252,878

SAFETY DEVICE FOR TRUCKS AND OTHER VEHICLES

Charles J. Bella, Davenport, and Edward W. Souter, Moss Beach, Calif.

Application May 17, 1941, Serial No. 393,964

6 Claims. (Cl. 188—4)

This invention relates to improvements in safety devices for trucks and other types of vehicles.

An object of our invention is to provide improvements in safety devices for preventing the backing downgrade of a truck or other vehicle equipped with the device.

Another object of our invention is to provide an improved safety device for use with trucks or other vehicles, consisting of releasable chains carried at the rear end of the vehicle for engaging with the latter's rear wheels when for some unforeseen reason the vehicle becomes uncontrollable and commences to back downgrade.

A still further object of our invention is to provide an improved safety device for trucks, trailers or other vehicles, comprising manually releasable chains carried on the rear end of the vehicle and adapted to fall downwardly to positions where the vehicle's rear wheels may engage therewith and thereby prevent the backward movement of the vehicle in case of accident or when the driver loses control thereof while proceeding on an upgrade.

Other and further objects of our invention will be pointed out hereinafter, indicated in the appended claims, or will be obvious to one skilled in the art upon an understanding of the present disclosure. For the purpose of this application we have elected to show herein certain forms and details of a safety device for trucks and other vehicles representative of our invention; it is to be understood, however, that the embodiment of our invention herein shown and described is for the purpose of illustration only, and therefore it is not to be regarded as exhaustive of the variations of the invention, nor is it to be given an interpretation such as might have the effect of limiting the claims short of the true and most comprehensive scope of the invention in the art.

Figure 1:
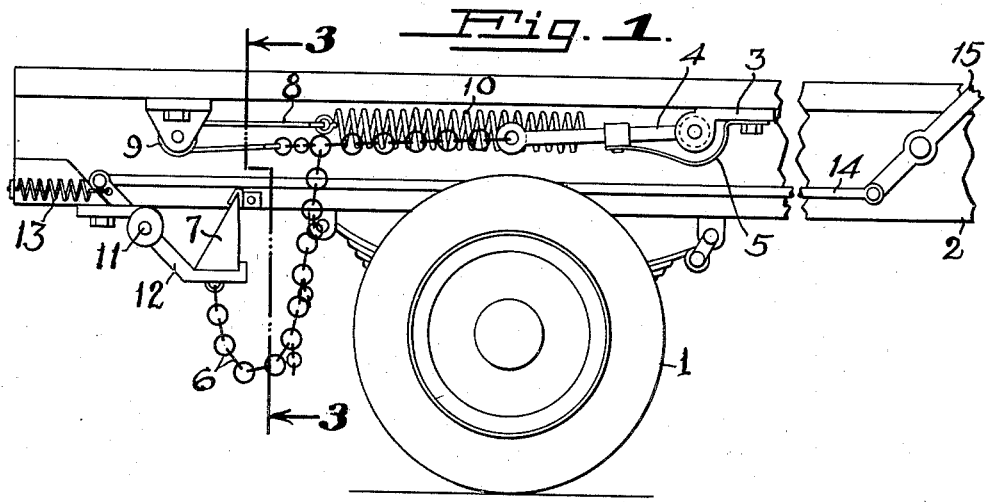
Fig. 1 is a side elevation of the rear end portion of a truck, trailer or other conventional vehicle, showing our safety device supported thereon in an unreleased position.
Figure 2:
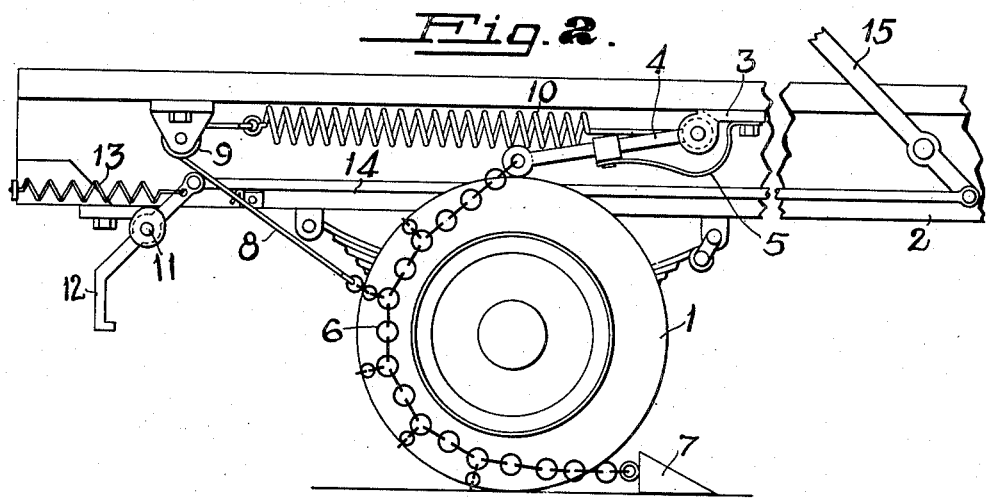
Fig. 2 is a similar view showing the safety device released and in an engaging position with respect to a rear vehicle wheel.
Figure 3:
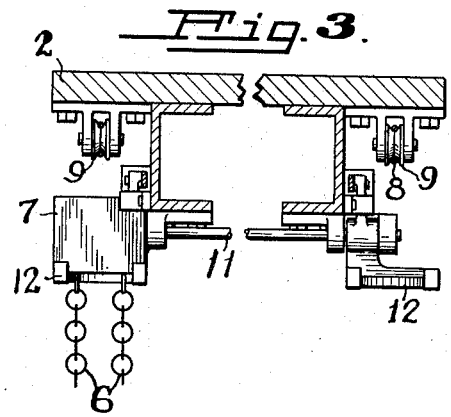
Fig. 3 is a sectional view taken on the line 3—3 of Fig. 1 showing one of the two block supporting members with a block mounted thereon, and for illustration purposes, the other of said members without its associated block supported thereon.

Referring to the drawing, the numeral 1 designates the usual rear wheels of a truck or other vehicle, having a chassis, frame or body 2 supported thereon.

Our invention contemplates the use of substantially duplicate devices with both rear wheels of a vehicle, so for the sake of brevity we will describe but one of them.

Pivotally secured at its rear end to a bracket 3 bolted to the frame 2 of the vehicle, is a rod 4 which is urged in an upward direction by a suitable spring 5. The rear end of the rod 4 overlies the vehicle wheel 1 and a chain 6 of the type used with vehicle wheels to prevent the slipping thereof in wet weather is secured thereto. The chain 6 is of the usual non-skid kind, consisting of parallel elongated duplex parts which are connected together at certain intervals by transversely disposed parts. The parallel parts of the chain normally extend around the tire of a vehicle wheel at opposite sides thereof, while the transverse parts extend over the tread and in engagement therewith.

Fastened to the free or rear end of the chain 6 is a wedge-shaped block 7 having a width somewhat exceeding the width of the tire. Secured to the chain 6 at points intermediate its ends is a cord or rope 8 which extends over a roller 9 and is fastened at its opposite end to the rear end of a spiral spring 10. The roller 9, as well as the forward end of the spring 10, is suitably anchored to the vehicle frame 2.

Pivotally mounted intermediate its ends as at 11 on the frame 2 at a point beneath the roller 9 and to the rear of the rear vehicle wheel 1, is a bifurcated block supporting member 12, the upper end of which is urged by a spiral spring 13 in a rearward direction. The spiral spring 13 normally maintains the block supporting member 12 with its lower hooked end projecting upwardly and in a position whereby the block 7 may be supported thereon. In such a position the chain 6 is held above the tire of the vehicle wheel 1 by the rod 4 which then assumes a substantially horizontal position and by the taut cord 8 which then is pulled by the spring 10 so its lower end is drawn upwardly to a point fairly near the roller 9.

Pivotally secured at its rearwardly disposed end to the upper end of the block supporting member 12 is an operating rod 14 which is provided at its forward end with a hand lever 15. The hand lever is preferably positioned within easy reach of the driver of the vehicle. The suitable manipulation of the hand lever 15 will cause the block supporting member 12 to be pivotally moved so its rear end is actuated in a downward and rearward direction, thereby causing the block 7 to be released therefrom. The block 7 upon falling to the ground exerts a downward pull on the cord 8 and the rear end of the rod 4. The normal resistance of the springs 10 and 5 to the downward pull exerted by the chain 6 upon the cord 8 and the rear end of the rod 4, causes the block 7 to slowly drop from the supporting member 12 to a suitable position on the road surface just behind the wheel 1 where it will intercept the said wheel as the vehicle backs downgrade. With the downward movement of the rod 4, the upper end of the chain 6 falls over the tire of the wheel 1 and as the wheel rolls backwardly over the block 7 the said chain being anchored at its upper end wraps itself around the tire. The firm engagement of the chain with the tire causes the wheel to be held stationary, thereby stopping the rearward movement of the vehicle.

The pivot rod 11 extends across the rear end of the vehicle frame 2 and each end thereof serves to rigidly mount a block supporting member 12. The suitable manipulation of the operating rod 14 will cause both block supporting members 12 to simultaneously move to positions where they release their associated blocks 7. After the vehicle is under control once again, the driver may cause the forward movement thereof in the usual manner. As the wheels 1 roll forwardly over their associated blocks 7, the springs 5 and 10 exert upward pulls on the chain 6, thereby bringing the latter to non-engaging positions with respect to the tires. When the driver deems it safe to do so, he may stop his vehicle and again position the blocks 7 on their respective supporting members 12.

It is to be understood that our invention, with slight modifications, may be satisfactorily used with trucks or trailers having dual sets of wheels on each side.

Figure 4:
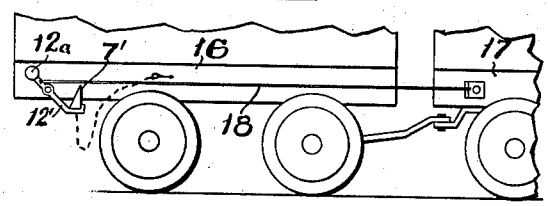
Fig. 4 is a diagrammatic view showing a modified form of our invention applied to a trailer.

In the modified form shown in Fig. 4, a pivoted block supporting member 12' having a counter-balancing weight 12a at its upper end is shown mounted on the rear end of a trailer body 16. The trailer body 16 is suitably connected to a truck 17. A line 18 connected at its front end to the truck and at its rear end to the upper end of the pivoted block supporting member 12' will exert a forward pull upon the upper end of the member if the trailer and the truck become separated from each other for any unforeseen reason. Normally the counter-balancing weight 12a maintains the lower end of the block supporting member 12' in a position where its associated block 7' is suitably supported. Should the connecting means between the truck and the trailer break on an upgrade and the said trailer commence to roll backwardly downhill, the line 18 will become taut and pull the counter-balancing weight 12a forwardly to actuate the supporting member 12' so the block 7' is released. The continued rearward movement of the trailer's wheel will cause its tire to engage the chain, as previously described.

It is apparent that the chain 6 may be made from rope, cord or other suitable material if so desired. It is therefore to be understood that the word "chain" as used throughout the specification and claims is to be considered generally as including within its scope any flexible device adapted to engage with the tire of a wheel when the latter rolls rearwardly.

Having described our invention, what we claim is:

1. A safety device for vehicles comprising a tire engaging chain anchored at its forward end to a vehicle and normally supported at its rear so it is in a non-engaging position above the wheel of the vehicle, and means for releasing the rear end of the chain whereby the latter may drop onto the tire of the vehicle wheel and firmly engage therewith when the said wheel rolls backwardly.

2. A safety device for vehicles comprising a tire engaging chain anchored at its forward end to a vehicle and normally supported at its rear end so it is in a releasable non-engaging position above a wheel of a vehicle, a weight member on the rear end of the chain, and means for releasing the rear end of the chain whereby the latter may drop onto the tire of the vehicle wheel and firmly engage therewith when the said wheel rolls backwardly.

3. A safety device for vehicles comprising a tire engaging chain anchored at its forward end to a vehicle and normally supported at its rear end in a releasable non-engaging position above a wheel of the vehicle, a pivoted supporting member mounted on the vehicle for releasably supporting the rear end of the chain, and manually controlled means for actuating the pivoted supporting member whereby the rear end of the chain may be released and the said chain may drop onto the tire of the vehicle wheel and firmly engage therewith when the said wheel rolls backwardly.

4. A safety device for vehicles comprising a tire engaging chain anchored at its forward end to a vehicle and normally supported at its rear end in a releasable non-engaging position above a wheel of the vehicle, a weight member secured to the rear end of the chain, a supporting member for the weight member, and manually controlled means for moving the supporting member to a position whereby the weight member is released and the chain is allowed to drop onto the tire of the vehicle wheel and firmly engage therewith when the said wheel rolls backwardly.

5. A safety device for vehicles, comprising a tire engaging chain anchored at its forward end to a vehicle and normally supported at its rear end so it is in a releasable non-engaging position above a wheel of the vehicle, a weight member secured to the rear end of the chain, a supporting member mounted on the vehicle for normally supporting the weight member, yieldable means fastened to the chain intermediate its ends for normally supporting the middle portion of the chain so the latter does not engage the vehicle wheel, and manually controlled means for actuating the supporting member to a position whereby the weight member is released and the chain is allowed to drop onto the tire of the vehicle wheel and firmly engage therewith when the said wheel rolls backward.

6. In combination with a vehicle and a connected trailer, a chain anchored at its forward end to the trailer and positioned with a portion thereof overlying a wheel of the trailer, a pivoted member on the trailer for releasably supporting the rear end of the chain, a counter-balancing weight on the pivoted member for normally holding the pivoted member in position whereby the latter supports the rear end of the chain, and a line connecting the pivoted member and the truck whereby when the truck and trailer are disconnected and they become relatively separated, the line will exert a pull on the supporting member overcoming the counter-balancing weight and thereby release the rear end of the chain and allow the latter to fall onto the tire of the trailer wheel and engage therewith when the trailer moves rearwardly.

CHARLES J. BELLA.
EDWARD W. SOUTER.